(12) United States Patent
Graunke et al.

(10) Patent No.: US 7,068,786 B1
(45) Date of Patent: Jun. 27, 2006

(54) DUAL USE BLOCK/STREAM CIPHER

(75) Inventors: Gary L. Graunke, Hillsboro, OR (US); David A. Lee, Beaverton, OR (US); Robert W. Faber, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/385,591

(22) Filed: Aug. 29, 1999

(51) Int. Cl.
*H04L 9/00* (2006.01)
*H04K 1/06* (2006.01)

(52) U.S. Cl. .................. 380/44; 380/29; 380/44; 708/250

(58) Field of Classification Search ............... 380/29, 380/37, 44; 780/250; 708/250
See application file for complete search history.

(56) References Cited

U.S. PATENT DOCUMENTS

| | | | |
|---|---|---|---|
| 3,798,360 A * | 3/1974 | Feistel | 380/37 |
| 4,316,055 A * | 2/1982 | Feistel | 380/37 |
| 4,613,901 A | 9/1986 | Gilhousen et al. | |
| 4,641,102 A * | 2/1987 | Coulthart et al. | 327/164 |
| 4,953,208 A | 8/1990 | Ideno | |
| 5,020,106 A | 5/1991 | Rabold et al. | |
| 5,195,136 A * | 3/1993 | Hardy et al. | 380/43 |
| 5,509,073 A | 4/1996 | Monnin | |
| 5,590,194 A | 12/1996 | Ryan | |
| 5,621,799 A | 4/1997 | Katta et al. | |
| 5,673,319 A | 9/1997 | Bellare et al. | |
| 5,680,131 A | 10/1997 | Utz | |
| 5,825,879 A | 10/1998 | Davis | |
| 5,852,472 A | 12/1998 | Prasad et al. | |
| 5,862,150 A | 1/1999 | Lavelle et al. | |
| 5,940,509 A | 8/1999 | Jovanovich et al. | |
| 6,005,940 A | 12/1999 | Kulinets | |
| 6,061,449 A | 5/2000 | Candelore et al. | |
| 6,167,136 A * | 12/2000 | Chou | 380/201 |
| 6,452,959 B1 * | 9/2002 | McDonough | 375/130 |
| 6,466,669 B1 * | 10/2002 | Matsui et al. | 380/37 |

(Continued)

FOREIGN PATENT DOCUMENTS

EP 0 599 366 2/1993

(Continued)

OTHER PUBLICATIONS

Schneier, Bruce; Applied Cryptography, 1996; John Wiley & Sons, Inc.; 2nd Edition, Chapters 12-17.*

(Continued)

Primary Examiner—Gilberto Barron, Jr.
Assistant Examiner—Jung W. Kim
(74) Attorney, Agent, or Firm—Blakely, Sokoloff, Taylor & Zafman LLP

(57) ABSTRACT

A dual use block/stream cipher is provided with a first key section and a data section. The first key section is to be initialized with a first cipher key, and to successively transform the first cipher key or a modified version of the first cipher key. The data section, coupled to the first key section, is to be initialized with either a block of plain text or a random number, and to successively and dependently, on the first key section, transform the plain text/random number. The cipher is further provided with a second key section and a mapping function. The second key section, coupled to the first key section, is selectively enableable to modify the first cipher key. The mapping section, coupled to the first key section, is to generate a pseudo random bit sequence when the second key section is selectably enabled to modify the stored first cipher key.

19 Claims, 3 Drawing Sheets

U.S. PATENT DOCUMENTS 6,477,252 B1* 11/2002 Faber et al. .............. 380/200

FOREIGN PATENT DOCUMENTS

| WO | WO 96-06504 | 2/1996 |
|---|---|---|
| WO | WO 99/18729 | 4/1999 |
| WO | WO 99/19822 | 4/1999 |
| WO | WO 01-17251 | 3/2001 |

OTHER PUBLICATIONS

Stallings, William; Cryptography and Network Security; Jun. 4, 1998; Prentice-Hall, Inc.; 2nd Edition, Chapter 3.*

Infocus Corporation; Digital Visual Interface (DVI) white paper; Nov. 2001; pp. 1-15.*

Silicon Image; High-Bandwidth Digital Content Protection white paper; Feb. 2000; pp. 1-11.*

Schneier et al.;"Unbalanced Feistel Networks and Block-Cipher Design"; Feb. 1996; Third International Workshop Proceedings; pp. 121-144.*

'High-bandwidth Digital Content Protection System'; Feb. 17, 2000; Intel Corporation; pp. 1-59.*

Schneier, Bruce; Applied Cryptography; 1996; John Wiley & Sons Inc.; 2nd Edition; Chapter 9.*

Bruce Schneier, "Applied Cryptography: protocols, algorithms, and source code in C", Second Edition, Library of Congress, Copyright 1996, Chapters 2-6 and 12-17.

Search Report for PCT/US 00/22785, mailed Dec. 6, 2000, 2 pages.

Search Report for PCT/US 00/22834, mailed Dec. 4, 2000, 1 page.

Written Opinion for PCT/US00/22834; 1 page.

Written Opinion for PCT/US/00/22785; 1 page.

International Preliminary Examination Report PCT/US00/22834. 6 Pages. Mailed Nov. 19, 2001.

Internation Preliminary Examination Report PCT/US00/22785. 7 Pages. Mailed Nov. 5, 2001.

Heys, Howard M., An Analysis of the Statistical Self-Synchronization of Stream Ciphers, IEEE INFOCOM 2001, pp. 897-204.

Heys, Howard M., Delay Characteristics of Statistical Cipher Feedback Mode, IEEE 2001, pp. 5-9.

Simmons, Gustavus J., Symmetric and Asymmetric Encryption, Computing Surveys, vol. 11, No. 4, Dec. 1979, pp. 305-330.

The Art Of Computer Programming, vol. 2/Seminumerical Algorithms, © 1969, Addison-Wesley Publishing Company, Inc., Reading, Massachusetts; Menlo Park, California; London; Amsterdam; Don Mills, Ontario; Sydney, pp. 30-31.

High-bandwidth Digital Content Protection System, Revision 1.0, Feb. 17, 2000, pp. 1-59.

* cited by examiner

DUAL USE BLOCK/STREAM CIPHER

BACKGROUND OF THE INVENTION

1. Field of the Invention

The present invention relates to the field of cryptography. More specifically, the present invention relates to the robustness of stream ciphers.

2. Background Information

Crytographic ciphers can be broadly divided into block ciphers and stream ciphers. Block ciphers cipher a block of plain text into ciphered text by applying multiple successive rounds of transformation to the plain text, using a cipher key. An example of a block cipher is the well known DES cipher. Stream ciphers cipher a stream of plain data into ciphered data by combining the stream of plain data with a pseudo random sequence dynamically generated using a cipher key. An example of a stream cipher is the well known XPD/KPD cipher.

Conventionally, if an application requires block as well as stream ciphering, both ciphers are provided. For hardware implementations, this is inefficient and wastes valuable real estate space. Accordingly, a dual use block/stream cipher that can be used as either block cipher or a stream cipher is desired.

SUMMARY OF THE INVENTION

A dual use block/stream cipher is provided with a first key section and a data section. The first key section is to be initialized with a first cipher key, and to successively transform the first cipher key or a modified version of the first cipher key. The data section, coupled to the first key section, is to be initialized with either a block of plain text or a random number, and to successively and dependently, on the first key section, transform the plain text/random number. The cipher is further provided with a second key section and a mapping function. The second key section, coupled to the first key section, is selectively enableable to modify the first cipher key. The mapping section, coupled to the first key section, is to generate a pseudo random bit sequence when the second key section is selectably enabled to modify the stored first cipher key.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described, and various details will be set forth in order to provide a thorough understanding of the present invention. However, it will be apparent to those skilled in the art that the present invention may be practiced with only some or all aspects of the present invention, and the present invention may be practiced without the specific details. In other instances, well known features are omitted or simplified in order not to obscure the present invention.

Various operations will be described as multiple discrete steps performed in turn in a manner that is most helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Figure 1:
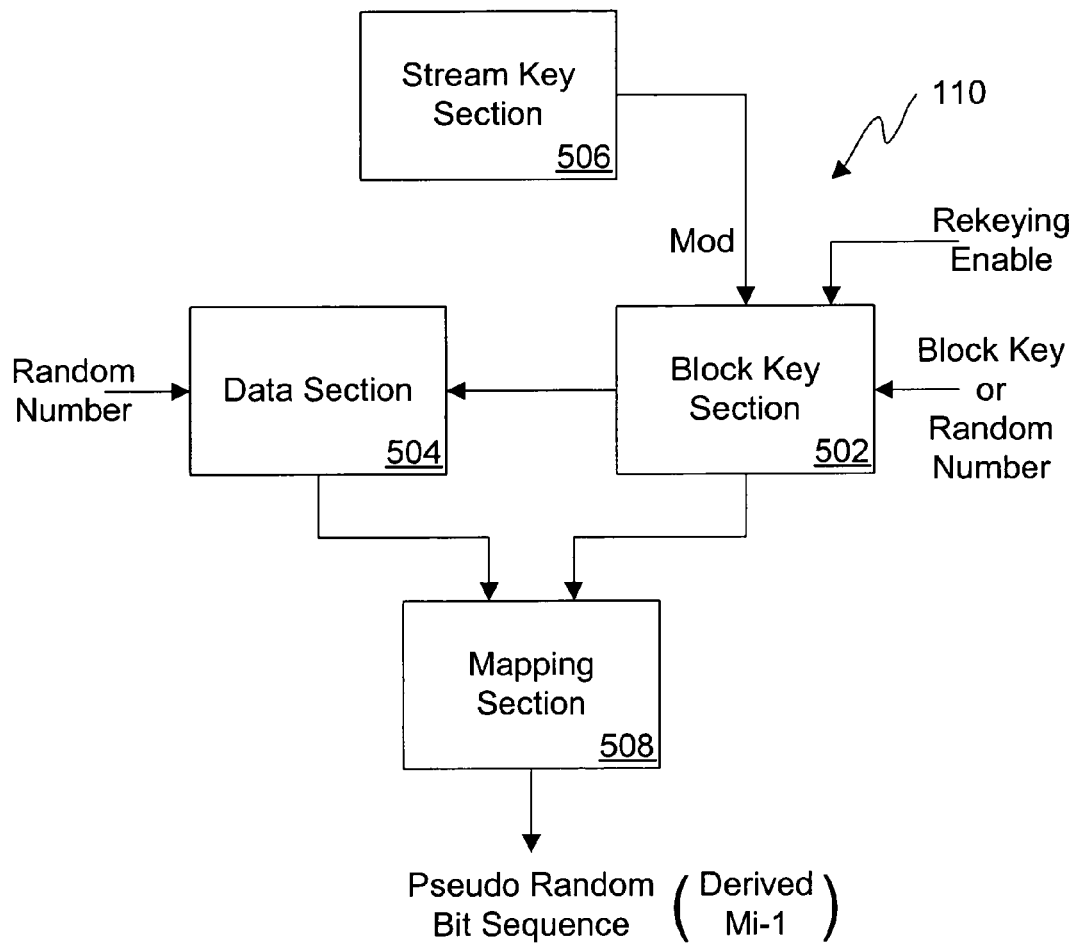
FIG. 1 illustrates an overview of the combined block/stream cipher of the present invention, in accordance with one embodiment.

Referring now to FIG. 1, wherein a block diagram illustrating the combined block/stream cipher of the present invention, in accordance with one embodiment, is shown. As illustrated, combined block/stream cipher 110 includes block key section 502, data section 504, stream key section 506, and mapping section 508, coupled to one another. Block key section 502 and data section 504 are employed in both the block mode as well as the stream mode of operation, whereas stream key section 506 and mapping section 508 are employed only in the stream mode of operation.

Briefly, in block mode, block key section 502 is provided with a block cipher key, such as an authentication key Km or a session key Ks of a video content protection application; whereas data section 504 is provided with the plain text, such as a basis random number An or a derived random number Mi-1 of a video content protection application. "Rekeying enable" signal is set to a "disabled" state, operatively de-coupling block key section 502 from stream key section 506 during the block mode of operation.

A video content protection application that uses Km, Kx, An and Mi is described in copending U.S. patent applications, Ser. No. 09/385,590, now issued U.S. Pat. No. 6,477, 252, and Ser. No. 09/385,592, filed contemporaneously, both entitled "Digital Video Content Transmission Ciphering/Deciphering Method and Apparatus", having common assignee and inventorship with the present application.

During each clock cycle, the block cipher key as well as the plain text are transformed. The block cipher key is independently transformed, whereas transformation of the plain text is dependent on the transformation being performed on the block cipher key. After a desired number of clock cycles, the provided plain text is transformed into ciphered text. For the video content protection method disclosed in above mentioned co-pending applications, when block key section 502 is provided with Km and data section 504 is provided with the An, ciphered An is read out and used as the session key Ks. When block key section 502 is provided with Ks and data section 504 is provided with the Mi-1, ciphered Mi-1 is read out and used as the frame key Ki.

To decipher the ciphered plain text, block key section 502 and data section 504 are used in like manner as described above to generate the intermediate "keys", which are stored away (in storage locations not shown). The stored intermediate "keys" are then applied to the ciphered text in reversed order, resulting in the deciphering of the ciphered text back into the original plain text. Another approach to deciphering the ciphered text will be described after block key section 502 and data section 504 have been further described in accordance with one embodiment each, referencing FIGS. 2–3.

In stream mode, stream key section 506 is provided with a stream cipher key, such as a session key Ks or a frame key Ki of a video content protection application. Block key section 502 and data section 504 are provided with random numbers, such as a session/frame keys Ks/Ki and a derived random numbers Mi-1 of a video content protection application. "Rekeying enable" signal is set to an "enabled" state, operatively coupling block key section 502 to stream key section 506. Periodically, at predetermined intervals, such as the horizontal blanking intervals of a video frame, stream key section 506 is used to generate one or more data bits to dynamically modify the then current state of the random number stored in block data section 502. During each clock cycle, in between the predetermined intervals, both random numbers stored in block key section 502 and data section 504 are transformed. The random number provided to block key section 502 is independently transformed, whereas transformation of the random number provided to data section 504 is dependent on the transformation being performed in block key section 502. Mapping block 506 retrieves a subset each, of the newly transformed states of the two random numbers, and reduces them to generate one bit of the pseudo random bit sequence. Thus, in a desired number of clock cycles, a pseudo random bit sequence of a desired length is generated.

For the illustrated embodiment, by virtue of the employment of the "rekeying enable" signal, stream key section 506 may be left operating even during the block mode, as its outputs are effectively discarded by the "rekeying enable" signal (set in a "disabled" state).

Figure 2:
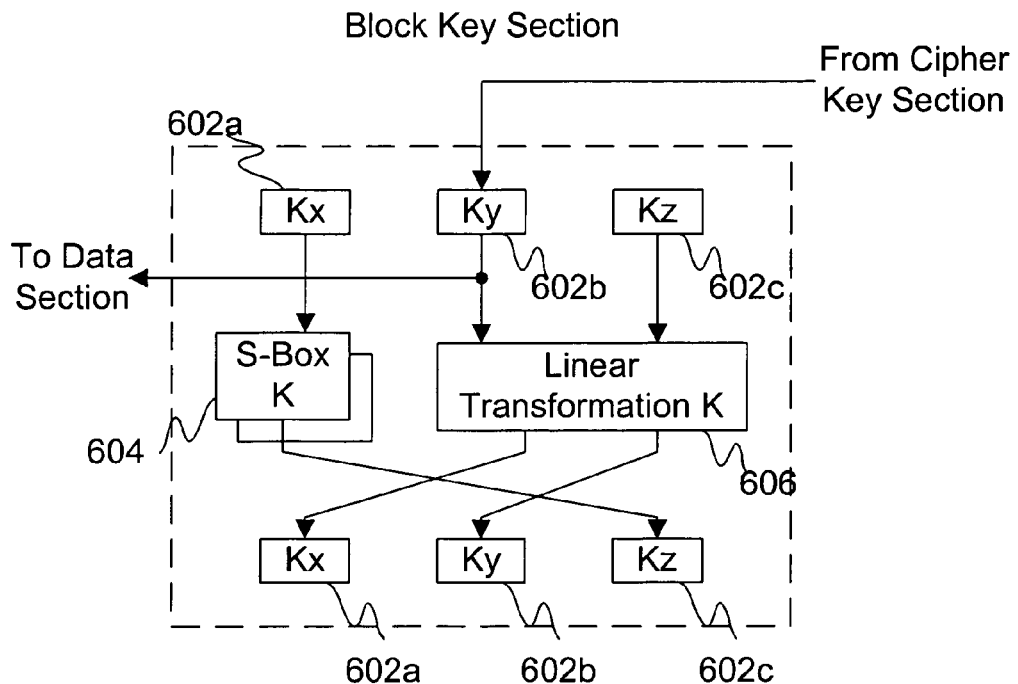
FIG. 2 illustrates the block key section of FIG. 1 in further detail, in accordance with one embodiment.

FIG. 2 illustrates the block key section of FIG. 1 in further detail, in accordance with one embodiment. As illustrated, block key section 502 includes registers 602a–602c, substitution boxes 604, and linear transformation unit 606. In block mode, registers 602a–602c are collectively initialized to a block cipher key, e.g. the earlier mentioned authentication key Km or session key Ks. In stream mode, registers 602a–602c are collectively initialized to a random number, e.g. the erlier mentioned session key Ks or frame key Ki. Each round, substitution boxes 604 and linear transformation unit 606 modify the content of registers 602a–602c. More specifically, substitution boxes 604 receive the content of register 602a, modify it, and then store the substituted content into register 602c. Similarly, linear transformation unit 606 receives the content of registers 602b and 602c, linearly transforms them, and then correspondingly stores the linearly transformed content into registers 602a and 602b.

Substitution boxes 604 and linear transformation unit 606 may be implemented in a variety of ways in accordance with well known cryptographic principles. One specific implementation is given in more detail below after the description of FIG. 3.

Figure 3:
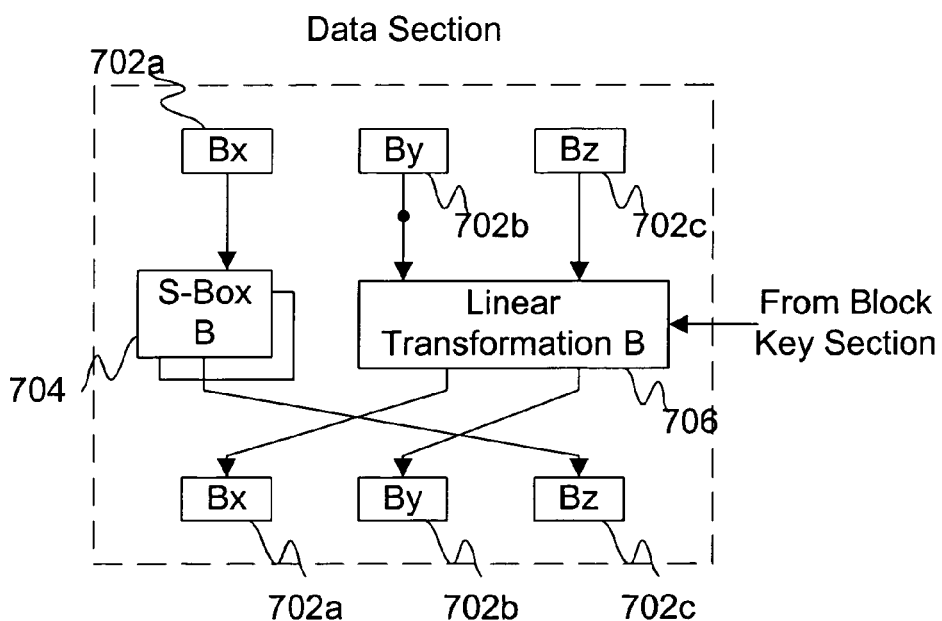
FIG. 3 illustrates the block data section of FIG. 1 in further detail, in accordance with one embodiment.

FIG. 3 illustrates the block data section of FIG. 1 in further detail, in accordance with one embodiment. For the illustrated embodiment, data section 504 is similarly constituted as block key section 502, except linear transformation unit 706 also takes into consideration the content of register 602b, when transforming the contents of registers 702b–702c. In block mode, registers 702a–702c are collectively initialized with the target plain text, e.g. earlier described random number An or derived random number Mi-1. In stream mode, registers 702a–702c are collectively initialized with a random number. Each round, substitution boxes 704 and linear transformation unit 706 modify the content of registers 702a–702c as described earlier for block key section 502 except for the differences noted above.

Again, substitution boxes 604 and linear transformation unit 606 may be implemented in a variety of ways in accordance with well known cryptographic principles.

In one implementation for the above described embodiment, each register 602a, 602b, 602c, 702a, 702b, 702c is 28-bit wide. [Whenever registers 602a–602c or 702a–702cb collectively initialized with a key value or random number less than 84 bits, the less than 84-bit number is initialized to the lower order bit positions with the higher order bit positions zero filled.] Additionally, each set of substitution boxes 604 or 704 are constituted with seven 4 input by 4 output substitution boxes. Each linear transformation unit 606 or 706 produces 56 output values by combining outputs from eight diffusion networks (each producing seven outputs). More specifically, the operation of substitution boxes 604/704 and linear transformation unit 606/706 are specified by the four tables to follow. For substitution boxes 604/704, the Ith input to box J is bit I*7+J of register 602a/702a, and output I of box J goes to bit I*7+j of register 602c/702c. [Bit 0 is the least significant bit.] For each diffusion network (linear transformation unit 606 as well as 706), the inputs are generally labeled I0–I6 and the outputs are labeled O0–O6. The extra inputs for each diffusion network of the linear transformation unit 706 is labeled K0–K6.

TABLE I

Substitution performed by each of the seven constituting substitution boxes of substitution boxes 604/704.

|  | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| SK0 | 8 | 14 | 5 | 9 | 3 | 0 | 12 | 6 | 1 | 11 | 15 | 2 | 4 | 7 | 10 | 13 |
| SK1 | 1 | 6 | 4 | 15 | 8 | 3 | 11 | 5 | 10 | 0 | 9 | 12 | 7 | 13 | 14 | 2 |
| SK2 | 13 | 11 | 8 | 6 | 7 | 4 | 2 | 15 | 1 | 12 | 14 | 0 | 10 | 3 | 9 | 5 |
| SK3 | 0 | 14 | 11 | 7 | 12 | 3 | 2 | 13 | 15 | 4 | 8 | 1 | 9 | 10 | 5 | 6 |
| SK4 | 12 | 7 | 15 | 8 | 11 | 14 | 1 | 4 | 6 | 10 | 3 | 5 | 0 | 9 | 13 | 2 |
| SK5 | 1 | 12 | 7 | 2 | 8 | 3 | 4 | 14 | 11 | 5 | 0 | 15 | 13 | 6 | 10 | 9 |
| SK6 | 10 | 7 | 6 | 1 | 0 | 14 | 3 | 13 | 12 | 9 | 11 | 2 | 15 | 5 | 4 | 8 |
| SB0 | 12 | 9 | 3 | 0 | 11 | 5 | 13 | 6 | 2 | 4 | 14 | 7 | 8 | 15 | 1 | 10 |
| SB1 | 3 | 8 | 14 | 1 | 5 | 2 | 11 | 13 | 10 | 4 | 9 | 7 | 6 | 15 | 12 | 0 |
| SB2 | 7 | 4 | 1 | 10 | 11 | 13 | 14 | 3 | 12 | 15 | 6 | 0 | 2 | 8 | 9 | 5 |
| SB3 | 6 | 3 | 1 | 4 | 10 | 12 | 15 | 2 | 5 | 14 | 11 | 8 | 9 | 7 | 0 | 13 |
| SB4 | 3 | 6 | 15 | 12 | 4 | 1 | 9 | 2 | 5 | 8 | 10 | 7 | 11 | 13 | 0 | 14 |
| SB5 | 11 | 14 | 6 | 8 | 5 | 2 | 12 | 7 | 1 | 4 | 15 | 3 | 10 | 13 | 9 | 0 |
| SB6 | 1 | 11 | 7 | 4 | 2 | 5 | 12 | 9 | 13 | 6 | 8 | 15 | 14 | 0 | 3 | 10 |

TABLE II

Diffusion networks for linear transformation unit 606/706 (continued in Tables III & IV).

| | Diffusion Network Logic Function |
|---|---|
| $O_0$ | $K_0 \oplus I_1 \oplus I_2 \oplus I_3 \oplus I_4 \oplus I_5 \oplus I_6$ |
| $O_1$ | $K_1 \oplus I_0 \oplus I_2 \oplus I_3 \oplus I_4 \oplus I_5 \oplus I_6$ |
| $O_2$ | $K_2 \oplus I_0 \oplus I_1 \oplus I_3 \oplus I_4 \oplus I_5 \oplus I_6$ |
| $O_3$ | $K_3 \oplus I_0 \oplus I_1 \oplus I_2 \oplus I_4 \oplus I_5 \oplus I_6$ |
| $O_4$ | $K_4 \oplus I_0 \oplus I_1 \oplus I_2 \oplus I_3 \oplus I_5 \oplus I_6$ |
| $O_5$ | $K_5 \oplus I_0 \oplus I_1 \oplus I_2 \oplus I_3 \oplus I_4 \oplus I_6$ |
| $O_6$ | $K_6 \oplus I_0 \oplus I_1 \oplus I_2 \oplus I_3 \oplus I_4 \oplus I_5 \oplus I_6$ |

TABLE III

Diffusion networks for linear transformation unit 606/706 (continued in Table IV).

| | K1 | K2 | K3 | K4 | K5 | K6 | K7 | K8 |
|---|---|---|---|---|---|---|---|---|
| $I_0$ | Kz0 | Ky0 | Ky4 | Ky8 | Ky12 | Ky16 | Ky20 | Ky24 |
| $I_1$ | Kz1 | Ky1 | Ky5 | Ky9 | Ky13 | Ky17 | Ky21 | Ky25 |
| $I_2$ | Kz2 | Ky2 | Ky6 | Ky10 | Ky14 | Ky18 | Ky22 | Ky26 |
| $I_3$ | Kz3 | Ky3 | Ky7 | Ky11 | Ky15 | Ky19 | Ky23 | Ky27 |
| $I_4$ | Kz4 | Kz7 | Kz10 | Kz13 | Kz16 | Kz19 | Kz22 | Kz25 |
| $I_5$ | Kz5 | Kz8 | Kz11 | Kz14 | Kz17 | Kz20 | Kz23 | Kz26 |
| $I_6$ | Kz6 | Kz9 | Kz12 | Kz15 | Kz18 | Kz21 | Kz24 | Kz27 |
| $O_0$ | Kx0 | Ky0 | Ky1 | Ky2 | Ky3 | Kx7 | Kx8 | Kx9 |
| $O_1$ | Kx1 | Ky4 | Ky5 | Ky6 | Ky7 | Kx10 | Kx11 | Kx12 |
| $O_2$ | Kx2 | Ky8 | Ky9 | Ky10 | Ky11 | Kx13 | Kx14 | Kx15 |
| $O_3$ | Kx3 | Ky12 | Ky13 | Ky14 | Ky15 | Kx16 | Kx17 | Kx18 |
| $O_4$ | Kx4 | Ky16 | Ky17 | Ky18 | Ky19 | Kx19 | Kx20 | Kx21 |
| $O_5$ | Kx5 | Ky20 | Ky21 | Ky22 | Ky23 | Kx22 | Kx23 | Kx24 |
| $O_6$ | Kx6 | Ky24 | Ky25 | Ky26 | Ky27 | Kx25 | Kx26 | Kx27 |

TABLE IV

Diffusion networks for linear transformation unit 606/706 (continued from Table III).

| | B1 | B2 | B3 | B4 | B5 | B6 | B7 | B8 |
|---|---|---|---|---|---|---|---|---|
| $I_0$ | Bz0 | By0 | By4 | By8 | By12 | By16 | By20 | By24 |
| $I_1$ | Bz1 | By1 | By5 | By9 | By13 | By17 | By21 | By25 |
| $I_2$ | Bz2 | By2 | By6 | By10 | By14 | By18 | By22 | By26 |
| $I_3$ | Bz3 | By3 | By7 | By11 | By15 | By19 | By23 | By27 |
| $I_4$ | Bz4 | Bz7 | Bz10 | Bz13 | Bz16 | Bz19 | Bz22 | Bz25 |
| $I_5$ | Bz5 | Bz8 | Bz11 | Bz14 | Bz17 | Bz20 | Bz23 | Bz26 |
| $I_6$ | Bz6 | Bz9 | Bz12 | Bz15 | Bz18 | Bz21 | Bz24 | Bz27 |
| $K_0$ | Ky0 | — | — | — | — | Ky7 | Ky14 | Ky21 |
| $K_1$ | Ky1 | — | — | — | — | Ky8 | Ky15 | Ky22 |
| $K_2$ | Ky2 | — | — | — | — | Ky9 | Ky16 | Ky23 |
| $K_3$ | Ky3 | — | — | — | — | Ky10 | Ky17 | Ky24 |
| $K_4$ | Ky4 | — | — | — | — | Ky11 | Ky18 | Ky25 |
| $K_5$ | Ky5 | — | — | — | — | Ky12 | Ky19 | Ky26 |
| $K_6$ | Ky6 | — | — | — | — | Ky13 | Ky20 | Ky27 |
| $O_0$ | Bx0 | By0 | By1 | By2 | By3 | Bx7 | Bx8 | Bx9 |
| $O_1$ | Bx1 | By4 | By5 | By6 | By7 | Bx10 | Bx11 | Bx12 |
| $O_2$ | Bx2 | By8 | By9 | By10 | By11 | Bx13 | Bx14 | Bx15 |
| $O_3$ | Bx3 | By12 | By13 | By14 | By15 | Bx16 | Bx17 | Bx18 |
| $O_4$ | Bx4 | By16 | By17 | By18 | By19 | Bx19 | Bx20 | Bx21 |
| $O_5$ | Bx5 | By20 | By21 | By22 | By23 | Bx22 | Bx23 | Bx24 |
| $O_6$ | Bx6 | By24 | By25 | By26 | By27 | Bx25 | Bx26 | Bx27 |

Referring now back to FIG. 1, recall that a ciphered text may be deciphered by generating the intermediate "keys" and applying them backward. Alternatively, for an embodiment where either the inverse of substitution boxes 604/704 and linear transformation units 606/706 are included or they may be dynamically reconfigured to operate in an inverse manner, the ciphered text may be deciphered as follows. First, the cipher key used to cipher the plain text is loaded into block key section 502, and block key section 502 is advanced by R−1 rounds, i.e. one round short of the number of rounds (R) applied to cipher the plain text. After the initial R−1 rounds, the ciphered text is loaded into data section 504, and both sections, block key section 502 and data section 504, are operated "backward", i.e. with substitution boxes 604/704 and linear transformation units 606/706 applying the inverse substitutions and linear transformations respectively.

Figure 4A:
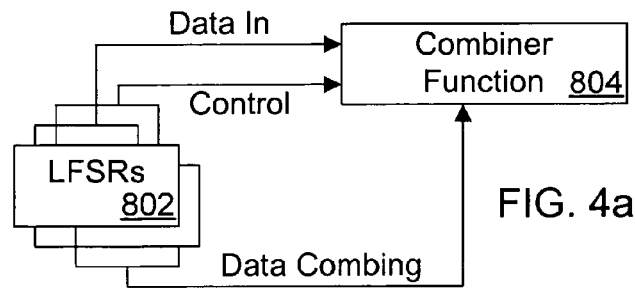
FIGS. 4a–4c illustrate the stream data section of FIG. 1 in further detail, in accordance with one embodiment.
Figure 4B:
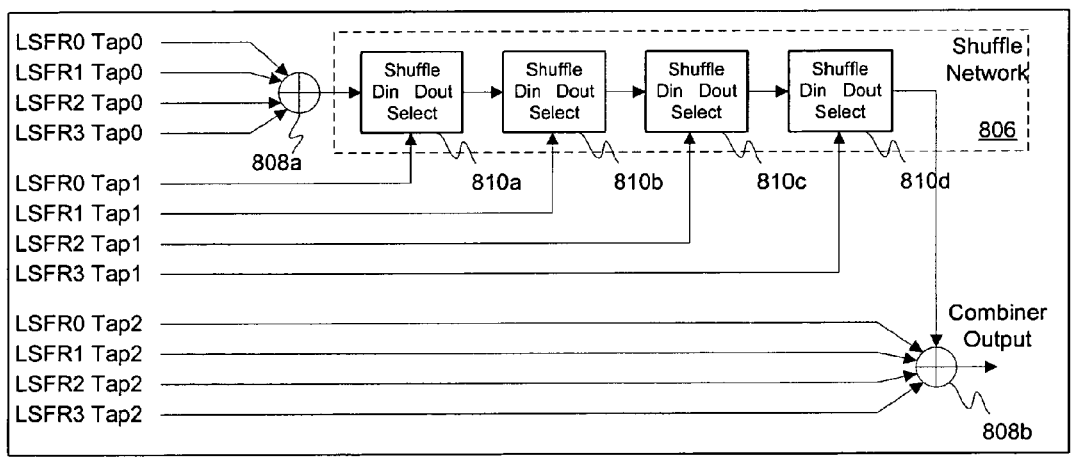
Figure 4C:
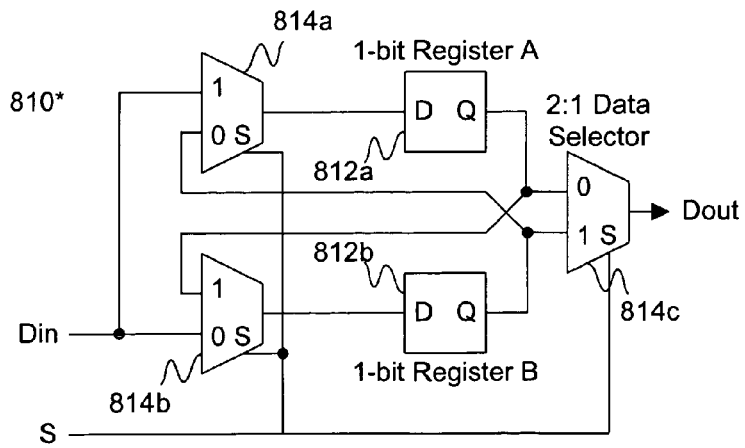

FIGS. 4a–4c illustrate the stream key section of FIG. 1 in further detail, in accordance with one embodiment. As illustrated in FIG. 4a, stream key section 506 includes a number of linear feedback shift registers (LFSRs) 802 and combiner function 804, coupled to each other as shown. LFSRs 802 are collectively initialized with a stream cipher key, e.g. earlier described frame key Ki. During operation, the stream cipher key is successively shifted through LFSRs 802. Selective outputs are taken from LFSRs 802, and combiner function 804 is used to combine the selective outputs. In stream mode (under which, rekeying is enabled), the combined result is used to dynamically modify a then current state of a block cipher key in block key section 502.

For the illustrated embodiment, four LFSRs of different lengths are employed. Three sets of outputs are taken from the four LFSRs. The polynomials represented by the LFSR and the bit positions of the three sets of LFSR outputs are given by the table to follows:

TABLE V

Polynomials of the LFSR and tap positions.

| | | Combining Function Taps | | |
|---|---|---|---|---|
| LFSR | Polynomial | 0 | 1 | 2 |
| 3 | $X^{17} + x^{15} + x^{11} + x^5 + 1$ | 6 | 12 | 17 |
| 2 | $X^{16} + x^{15} + x^{12} + x^8 + x^7 + x^5 + 1$ | 6 | 10 | 16 |
| 1 | $X^{14} + x^{11} + x^{10} + x^7 + x^6 + x^4 + 1$ | 5 | 9 | 14 |
| 0 | $X^{13} + x^{11} + x^9 + x^5 + 1$ | 4 | 8 | 13 |

The combined result is generated from the third set of LFSR outputs, using the first and second set of LFSR outputs as data and control inputs respectively to combiner function 802. The third set of LFSR outputs are combined into a single bit. In stream mode (under which, rekeying is enabled), the combined single bit is then used to dynamically modify a predetermined bit of a then current state of a block cipher key in block key section 502.

FIG. 4b illustrates combiner function 804 in further detail, in accordance with one embodiment. As illustrated, combiner function 804 includes shuffle network 806 and XOR 808a–808b, serially coupled to each other and LFSRs 802 as shown. For the illustrated embodiment, shuffle network 806 includes four binary shuffle units 810a–810d serially coupled to each other, with first and last binary shuffle units 810a and 810d coupled to XOR 808a and 808b respectively.

XOR 808*a* takes the first group of LFSR outputs and combined them as a single bit input for shuffle network 806. Binary shuffle units 810*a*–810*d* serially propagate and shuffle the output of XOR 808*a*. The second group of LFSR outputs are used to control the shuffling at corresponding ones of binary shuffle units 810*a*–810*d*. XOR 808*b* combines the third set of LFSR outputs with the output of last binary shuffle unit 810*d*.

cally, each of the 24 bits is generated by performing the XOR operation on nine terms in accordance with the following formula:

$$(B0 \cdot K0) \oplus (B1 \cdot K1) \oplus (B2 \cdot K2) \oplus (B3 \cdot K3) \oplus (B4 \cdot K4) \oplus (B5 \cdot K5) \oplus (B6 \cdot K6) \oplus B7 \oplus K7$$

Where "$\oplus$" represents a logical XOR function, "•" represents a logical AND function, and the input values B and K for the 24 output bits are

| | Input Origin | | | | | | | | | | | | | | | |
|---|---|---|---|---|---|---|---|---|---|---|---|---|---|---|---|---|
| Output bit | B0 Bz | B1 Bz | B2 Bz | B3 Bz | B4 Bz | B5 Bz | B6 Bz | B7 By | K0 Kz | K1 Kz | K2 Kz | K3 Kz | K4 Kz | K5 Kz | K6 Kz | K7 Ky |
| 0 | 14 | 23 | 7 | 27 | 3 | 18 | 8 | 20 | 12 | 24 | 0 | 9 | 16 | 7 | 20 | 13 |
| 1 | 20 | 26 | 6 | 15 | 8 | 19 | 0 | 10 | 26 | 18 | 1 | 11 | 6 | 20 | 12 | 19 |
| 2 | 7 | 20 | 2 | 10 | 19 | 14 | 26 | 17 | 1 | 22 | 8 | 13 | 7 | 16 | 25 | 3 |
| 3 | 22 | 12 | 6 | 17 | 3 | 10 | 27 | 4 | 24 | 2 | 9 | 5 | 14 | 18 | 21 | 15 |
| 4 | 22 | 24 | 14 | 18 | 7 | 1 | 9 | 21 | 19 | 24 | 20 | 8 | 13 | 6 | 3 | 5 |
| 5 | 12 | 1 | 16 | 5 | 10 | 24 | 20 | 14 | 27 | 2 | 8 | 16 | 15 | 22 | 4 | 21 |
| 6 | 5 | 3 | 27 | 8 | 17 | 15 | 21 | 12 | 14 | 23 | 16 | 10 | 27 | 1 | 7 | 17 |
| 7 | 9 | 20 | 1 | 16 | 5 | 25 | 12 | 6 | 9 | 13 | 22 | 17 | 1 | 24 | 5 | 11 |
| 8 | 23 | 25 | 11 | 13 | 17 | 1 | 6 | 22 | 25 | 21 | 18 | 15 | 6 | 11 | 1 | 10 |
| 9 | 4 | 0 | 22 | 17 | 25 | 10 | 15 | 18 | 0 | 20 | 26 | 19 | 4 | 15 | 9 | 27 |
| 10 | 23 | 25 | 9 | 2 | 13 | 16 | 4 | 8 | 2 | 11 | 27 | 19 | 14 | 22 | 4 | 7 |
| 11 | 3 | 6 | 20 | 12 | 25 | 19 | 10 | 27 | 24 | 3 | 14 | 6 | 23 | 17 | 10 | 1 |
| 12 | 26 | 1 | 18 | 21 | 14 | 4 | 10 | 0 | 17 | 7 | 26 | 0 | 23 | 11 | 14 | 8 |
| 13 | 2 | 11 | 4 | 21 | 15 | 24 | 18 | 9 | 5 | 16 | 12 | 2 | 26 | 23 | 11 | 6 |
| 14 | 22 | 24 | 3 | 19 | 11 | 4 | 13 | 5 | 22 | 0 | 18 | 8 | 25 | 5 | 15 | 2 |
| 15 | 12 | 0 | 27 | 11 | 22 | 5 | 16 | 1 | 10 | 3 | 15 | 19 | 21 | 27 | 6 | 18 |
| 16 | 24 | 20 | 2 | 7 | 15 | 18 | 8 | 3 | 12 | 20 | 5 | 19 | 1 | 27 | 8 | 23 |
| 17 | 12 | 16 | 8 | 24 | 7 | 2 | 21 | 23 | 17 | 2 | 11 | 14 | 7 | 25 | 22 | 16 |
| 18 | 19 | 3 | 22 | 9 | 13 | 6 | 25 | 7 | 4 | 10 | 2 | 17 | 21 | 24 | 13 | 22 |
| 19 | 11 | 17 | 13 | 26 | 4 | 21 | 2 | 16 | 3 | 4 | 13 | 26 | 18 | 23 | 9 | 25 |
| 20 | 17 | 23 | 26 | 14 | 5 | 11 | 0 | 15 | 26 | 3 | 9 | 19 | 21 | 12 | 6 | 0 |
| 21 | 9 | 14 | 23 | 16 | 27 | 0 | 6 | 24 | 18 | 21 | 3 | 27 | 4 | 10 | 15 | 26 |
| 22 | 7 | 21 | 8 | 13 | 1 | 26 | 19 | 25 | 25 | 0 | 12 | 10 | 7 | 17 | 23 | 9 |
| 23 | 27 | 15 | 23 | 5 | 0 | 9 | 18 | 11 | 8 | 0 | 25 | 20 | 16 | 5 | 13 | 12 |

FIG. 4*c* illustrates one binary shuffle unit 810* (where * is one of a–d) in further detail, in accordance with one embodiment. Each binary shuffle unit 810* includes two flip-flops 812*a* and 812*b*, and a number of selectors 814*a*–814*c*, coupled to each other as shown. Flip-flops 812*a* and 812*b* are used to store two state values (A, B). Each selector 814*a*, 814*b* or 814*c* receives a corresponding one of the second group of LFSR outputs as its control signal. Selector 814*a*–814*b* also each receives the output of XOR 808*a* or an immediately preceding binary shuffle unit 810* as input. Selector 814*a*–814*b* are coupled to flip-flops 812*a*–812*b* to output one of the two stored state values and to shuffle as well as modify the stored values in accordance with the state of the select signal. More specifically, for the illustrated embodiment, if the stored state values are (A, B), and the input and select values are (D, S), binary shuffle unit 810* outputs A, and stores (B, D) if the value of S is "0". Binary shuffle unit 810* outputs B, and stores (D, A) if the value of S is "1".

Referring now to back to FIG. 1, as illustrated and described earlier, mapping function 508 generates the pseudo random bit sequence based on the contents of selected registers of block key section 502 and data section 504. In one embodiment, where block key section 502 and data section 504 are implemented in accordance with the respective embodiments illustrated in FIGS. 2–3, mapping function 508 generates the pseudo random bit sequence at 24-bit per clock based on the contents of registers (Ky and Kz) 602*b*–602*c* and (By and Bz) 702*b*–702*c*. More specifi- Accordingly, a novel dual use block or stream cipher has been described.

EPILOGUE

From the foregoing description, those skilled in the art will recognize that many other variations of the present invention are possible. In particular, while the present invention has been described with the illustrated embodiments, non-LFSR based stream key section, more or less block key registers, larger or smaller block key registers, more or less substitution units, including alternative substitution patterns, as well as different linear transformation units may be employed. Thus, the present invention is not limited by the details described, instead, the present invention can be practiced with modifications and alterations within the spirit and scope of the appended claims.

What is claimed is:

1. An encoding apparatus comprising:
   a block cipher key section to be initialized with a block cipher key, having transformation units to transform the block cipher key into a transformed block cipher key;
   a data section coupled with the block cipher key section to be initialized with a random number, having transformation units to transform the random number based on the transformed block cipher key;
   a stream cipher key section coupled with the block cipher key section to modify the block cipher key according to a stream cipher key to produce data bits to dynamically modify the random number into a modified random number in the data block section, wherein the stream cipher key section further includes linear feedback shift registers (LFSRs) to generate a first, second, and third sequence of data bits, and a serial network of shuffle units to shuffle the third sequence of data bits using the first sequence of data bits and input bits and the second sequence of data bits and control bits to the serial network of shuffle units; and a mapping section to receive the modified random number and the transformed block cipher key and generate a pseudo random bit sequence based on the modified random number and the transformed block cipher key.

2. An apparatus according to claim 1, wherein the block cipher key section further includes first, second, and third registers, to be collectively initialized with the block cipher key.

3. An apparatus according to claim 2, wherein the block cipher key section further includes substitution units coupled between an output of the first register and an input of the third register, to make at least a partial substitution to the content of the first register and store the substituted content in the third register.

4. An apparatus according to claim 2, wherein the block cipher key section further includes a linear transformation unit coupled between an output of the second register and an input of the first register and an output of the third register and an input of the second register, to produce a linearly transformed version of the content of the second and third registers, and store the linearly transformed versions in the first and second registers, respectively.

5. An apparatus according to claim 1, wherein the data section is initialized with plain text.

6. An apparatus according to claim 1, wherein the data section is initialized with derived random number Mi-1.

7. An apparatus according to claim 1, wherein the data section further includes fourth, fifth, and sixth registers, to be collectively initialized with the random number.

8. An apparatus according to claim 7, wherein the data section further includes substitution units coupled between an output of the fourth register and an input of the sixth register, to make at least a partial substitution to the content of the fourth register and store the substituted content in the sixth register.

9. An apparatus according to claim 7, wherein the data section further includes a linear transformation unit coupled between an output of the fifth register and an input of the fourth register and an output of the sixth register and an input of the fifth register, to produce a linearly transformed version of the content of the fifth and sixth registers, and store the linearly transformed versions in the fourth and fifth registers, respectively.

10. An apparatus according to claim 7, wherein the block cipher key section includes first, second, and third registers to be collectively initialized with the block cipher key, and wherein the mapping section comprises a plurality of logical gates coupled with a register in the block cipher key section and a register in the data section.

11. An apparatus comprising:

a first key section to be enabled in a stream cipher mode and disabled in a block cipher mode, and to selectively modify a cipher key into a selectively modified cipher key;

a second key section to be coupled with the first key section in the stream cipher mode, and having a first, second, and third registers to be collectively initialized with the cipher key, and transformation units coupled with the first, second, and third registers to recursively transform the selectively modified cipher key into a transformed selectively modified cipher key;

a data section coupled with the second key section, having a fourth, fifth, and sixth registers to be collectively initialized with a data bit sequence, and transformation units coupled with the fourth, fifth, and sixth registers to transform the data bit sequence into a transformed data bit sequence according to the transformed selectively modified cipher key; and a mapping section coupled with the second key section and the data section to generate a pseudo random bit sequence with the transformed data bit sequence.

12. An apparatus according to claim 11, wherein the first key section further includes linear feedback shift registers (LFSRs) to generate a first, second, and third sequence of data bits, and a serial network of shuffle units to shuffle the third sequence of data bits using the first sequence of data bits and input bits and the second sequence of data bits and control bits to the serial network of shuffle units.

13. An apparatus according to claim 11, wherein the second key section further includes substitution units coupled between an output of the first register and an input of the third register, to make at least a partial substitution to the content of the first register and store the substituted content in the third register.

14. An apparatus according to claim 11, wherein the second key section further includes a linear transformation unit coupled between an output of the second register and an input of the first register and an output of the third register and an input of the second register, to produce a linearly transformed version of the content of the second and third registers, and store the linearly transformed versions in the first and second registers, respectively.

15. An apparatus according to claim 11, wherein the data section is initialized with plain text.

16. An apparatus according to claim 11, wherein the data section is initialized with derived random number Mi-1.

17. An apparatus according to claim 11, wherein the data section further includes substitution units coupled between an output of the fourth register and an input of the sixth register, to make at least a partial substitution to the content of the fourth register and store the substituted content in the sixth register.

18. An apparatus according to claim 11, wherein the data section further includes a linear transformation unit coupled between an output of the fifth register and an input of the fourth register and an output of the sixth register and an input of the fifth register, to produce a linearly transformed version of the content of the fifth and sixth registers, and store the linearly transformed versions in the fourth and fifth registers, respectively.

19. An apparatus according to claim 11, wherein the mapping section comprises a plurality of logical gates coupled with a register in the second key section and a register in the data section.

* * * * *